United States Patent [19]

Lynch et al.

[11] 4,444,357

[45] Apr. 24, 1984

[54] DIFFERING-TEMPERATURE LIQUID-MIXING APPARATUS AND METHOD USING PULSED, DUTY-CYCLE TEMPERATURE CONTROL

[75] Inventors: M. Dee Lynch, Beaverton; James W. Bernklau, Tigard, both of Oreg.

[73] Assignee: Quadratec Associates, Beaverton, Oreg.

[21] Appl. No.: 347,103

[22] Filed: Feb. 9, 1982

[51] Int. Cl.³ ............................................. G05D 23/00
[52] U.S. Cl. ................................. 236/12.12; 236/12.15; 137/896
[58] Field of Search ................ 236/12, 13, 91 F, 78 B, 236/12.1, 12.12, 12.15; 366/341, 336, 337, 338; 137/896, 897, 898

[56] References Cited

U.S. PATENT DOCUMENTS

| | | | |
|---|---|---|---|
| 3,021,474 | 2/1962 | Byloff | 236/13 X |
| 3,450,022 | 6/1969 | Engel | 99/287 X |
| 3,459,407 | 8/1969 | Hazlehurst et al. | 138/38 X |
| 4,165,360 | 8/1979 | Casper et al. | 422/202 |

FOREIGN PATENT DOCUMENTS 2614509  10/1977  Fed. Rep. of Germany ... 236/12 A

*Primary Examiner*—Henry C. Yuen
*Assistant Examiner*—Harry Tanner
*Attorney, Agent, or Firm*—Kolisch, Hartwell, Dickinson & Anderson

[57] ABSTRACT

A method and apparatus for producing from two different liquid input streams which are at different temperatures, a single output stream with a selectable, low-thermal-noise, regulated temperature which is intermediate the input streams' temperatures. The invention operates with successive, recurrent, fixed-length operating cycles, during each of which a variable-length pulse of liquid from each stream, exclusively, is permitted to flow. Temperature monitoring of the resulting blended output stream effects continuous adjustment of the respective pulse-lengths (or duty cycles) of such alternate differing-temperature pulses to maintain the desired regulated temperature.

3 Claims, 5 Drawing Figures

DIFFERING-TEMPERATURE LIQUID-MIXING APPARATUS AND METHOD USING PULSED, DUTY-CYCLE TEMPERATURE CONTROL

BACKGROUND AND SUMMARY OF THE INVENTION

This invention relates to the production, from two different liquid input streams which are at different temperatures, of a single output stream with a selectable, low-average-thermal-noise regulated temperature which is intermediate the input streams' temperatures. The invention, while having clear applicability in a number of different settings, is described hereinbelow in connection with a film-processing system in which it has been found to offer particular utility.

There are many fields, such as the field of photographic processing, where regulated control of the temperature of a liquid, such as water, is critical. For example, and in the field specifically of film processing, an inadvertent change of even a fraction of a degree in the temperature of water which is used during processing can affect seriously the quality of the final processed image. Often, this kind of processing takes place substantially automatically in various types of film-processing machines. One such type of machine, wherein the method and apparatus of the present invention have been found to offer a decided advantage, is a machine like that described in U.S. Pat. No. 3,695,162—the disclosure of which is incorporated herein by reference, simply for the purpose of setting the background of the invention. Machines like this have been available for a number of years, often fitted with mechanical-type temperature-control sub-systems. However, such known sub-systems have been shown to experience considerable difficulty in maintaining a proper preselected water temperature, where input variables, such as flow-rate, pressure, and hot and cold water temperatures, fluctuate, as is customary in the usual public water-supply system.

A general object of the present invention is to provide a unique method and apparatus which results in merger, into a single, low-average-thermal-noise, temperature-regulated stream, water flows received from the usual hot and cold water outlets in a facility.

More particularly, an object of the invention is to provide such a method and apparatus in which the usual to-be-expected changes in flow-rate, pressure and temperature in such hot and cold water streams are quickly taken care of, so that in the merged outlet stream, very precise temperature control is achieved, with extremely low-average-level thermal noise.

According to a preferred embodiment of, and way of practicing, the present invention, hot and cold inlet water streams, derived from the usual water supply in a facility, are fed intermittently, and in a pulsed fashion, into an output conduit which directly feeds a heat-exchanging coil formed of copper, or of another suitable material having a relatively high thermal conductivity. A fixed-duration, recurrent operating cycle is defined, during each one of which cold water flows for a predetermined first part of the interval, and hot water flows during the remainder of the interval. Temperature sensors are placed on the discharge side of the output conduit and on the discharge end of the coil. These sensors are coupled to a control circuit which compares the responses produced by the two sensors with an adjustable bias voltage whose level is settable, substantially infinitely throughout a defined range, to establish the desired regulated temperature in the final output stream. The control circuit controls actuation of valving apparatus, which in turn determines when hot, and when cold, water flows. The fixed interval referred to above remains unchanged, and temperature control is achieved by adjusting the percentages of that interval characterized by hot and cold water flows. The particular flow periods for each of the two input streams during a given interval are referred to as the duty cycles for the two streams.

For example, if, during a given interval, cold water flows for 30% of the time, and hot water flows for 70% of the time, the resulting blend will exhibit a temperature which is warmer than if the reverse situation were the case. Regardless of pressures, flow-rates or temperatures of the input streams, so long as the regulated temperature which is called for is between the temperature extremes of the input streams, very precise temperature control, with extremely low average thermal noise, is achievable. In fact, tests conducted using the invention have shown its capability to maintain the average temperature of a merged output stream to within about ±0.2° F. with respect to the regulated temperature called for.

These and other objects and advantages which are achieved by the invention will become more fully apparent as the description which now follows is read in conjunction with the accompanying drawings.

DETAILED DESCRIPTION OF THE INVENTION

Figure 1:
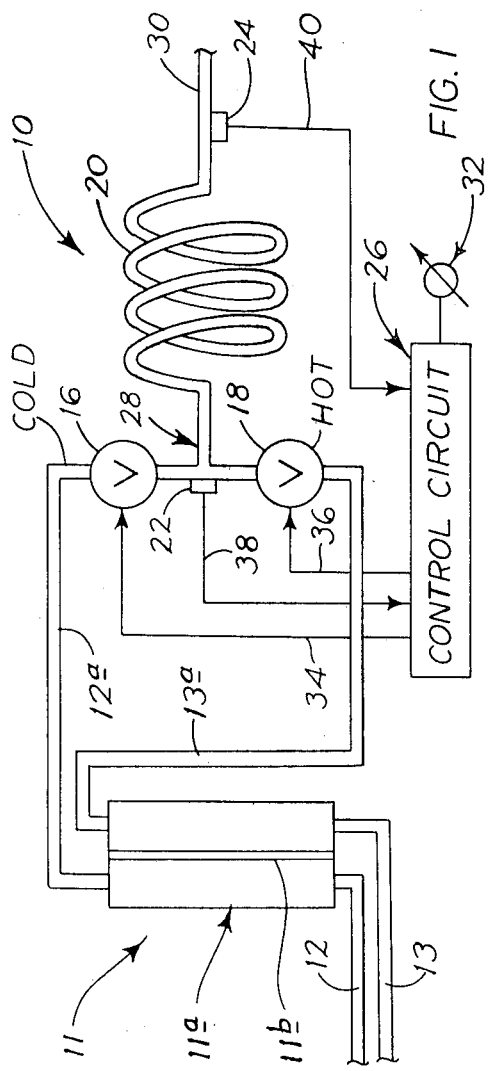
FIG. 1 is a simplified fragmentary diagram illustrating apparatus constructed according to the invention connected for use with a conventional hot and cold water supply.

Turning now to the drawings, and referring first to FIG. 1, indicated generally at 10 is a temperature-controlling, liquid-stream-blending apparatus constructed in accordance with the present invention. Apparatus 10 is shown connected for use, as will be explained, through an anti-hammer device 11, with a conventional water supply system, including the usual cold water conduit 12 and hot water conduit 13. These two conduits supply, under pressure, streams of water, with the temperature of the stream in conduit 12 typically ranging between about 40° F. and about 80° F., and that in conduit 13 typically ranging between about 105° F. and about 180° F. For the purpose of explanation herein, the stream of cold water will be considered to have a temperature of about 60° F., and the stream of hot water a temperature of about 160° F. Conduits 12, 13 herein have cross-sectional diameters of about ⅜-inches, with each supplying its water stream at a pressure of about 60-pounds-per-square-inch.

It should be understood that while device 11 forms no part of the present invention, and could be eliminated as far as the functioning of apparatus 10 is concerned, it is a preferable appendage in minimizing so-called "water-hammer" in the upstream plumbing. Generally speaking, device 11 includes a housing 11a divided into left and right fluid chambers in FIG. 1 by a central flexible diaphragm 11b. In general terms, the diaphragm flexes back and forth between these chambers as water alternately flows, as will be explained, in pulses from conduits 12, 13.

Continuing with a description of FIG. 1, cold-water conduit 12 connects with the base of the left chamber in device 11, and hot-water conduit 13 connects with the base of the right chamber in the device. Extending from the top of the left chamber is conduit 12a, and extending from the top of the right chamber is a conduit 13a. These two latter-mentioned conduits connect, as will shortly be described, to apparatus 10. Conduits 12a, 13a have substantially the same inside diameters as do conduits 12, 13.

Apparatus 10 herein includes a pair of solenoid-actuated valves 16, 18 (also referred to as valve means), a copper heat-exchanging coil (or fluid conduit means) 20, a pair of thermistors (or temperature sensors) 22, 24, and a control circuit (or circuit means) 26. Thermistors 22, 24, within the operating ranges wherein they are used herein, and in conjunction with other related circuitry, exhibit substantially linear, negative temperature coefficients. That is, the greater their respective temperatures, the lower their respective resistances, and vice versa.

The inlets of valves 16, 18 are connected directly to conduits 12a, 13a, respectively, and their outlets are connected to the upper and lower ends (in FIG. 1) of a T-coupling 28. That portion of coupling 28 which extends to the right in FIG. 1 feeds a single, merged, output water stream to the feed end of coil 20 (the left end thereof in FIG. 1). The discharge end of coil 20 (the right end thereof in FIG. 1) connects with a suitable discharge conduit 30. The inside diameters of the fluid passages in coil 20, coupling 28, and conduit 30 are each about ⅜-inches.

Control circuit 26, which includes a potentiometer shown schematically at 32 for selecting, infinitively in a defined range, a regulation temperature, is connected electrically for actuating the solenoids for valves 16, 18. Such connections are indicated by lines 34, 36, respectively. Information respecting the temperature of water at two locations in the apparatus (i.e., substantially adjacent the opposite ends of coil 20), is fed to the control circuit from thermistors 22, 24, as indicated by lines 38, 40, respectively. In accordance with the manner in which apparatus 10 operates herein, whenever valve 16 is open, valve 18 is closed, and vice versa. For this reason, apparatus 10 is referred to as having two different operating states for the valves.

Control circuit 26 coacts with valves 16, 18 to produce what is referred to as a fixed-length operating interval—which interval is repeated recurrently with apparatus 10 in use. While different specific operating intervals may be selected, apparatus 10 employs an interval of about 1-second. Further explaining, within each operating interval, the interval begins typically with opening of valve 16 (alone) for a certain portion of the interval, followed by closure of valve 16, and substantially simultaneous opening of valve 18 (alone) for the remaining portion of the interval. The control circuit responds to the temperatures sensed by thermistors 22, 24 to control the respective lengths of these two "valve-open", "valve-close" portions of an interval. As a consequence of this activity, alternate pulses of hot and cold water are merged in coupling 28, and are supplied to the feed end of coil 20. The respective periods of time that valves 16, 18 are open during successive operating intervals determine the temperature of the final blend. While quite accurate control of temperature can be effected without the use of a heat-exchanging coil like coil 20, or of a "secondary" temperature sensor, like thermistor 24, the inclusion of these two devices is preferable for enhancing the accuracy of control. Coil 20 acts as a quick-response, continuous-flow heat exchanger, which alternately extracts and returns heat from the different-temperature pulses as the same merge and blend throughout their travel in the coil. Sensor 24 coacts with control circuit 26 in what might be thought of as a fine-tuning fashion, to assure extremely low average thermal noise in the discharge stream entering conduit 30.

Figure 2:
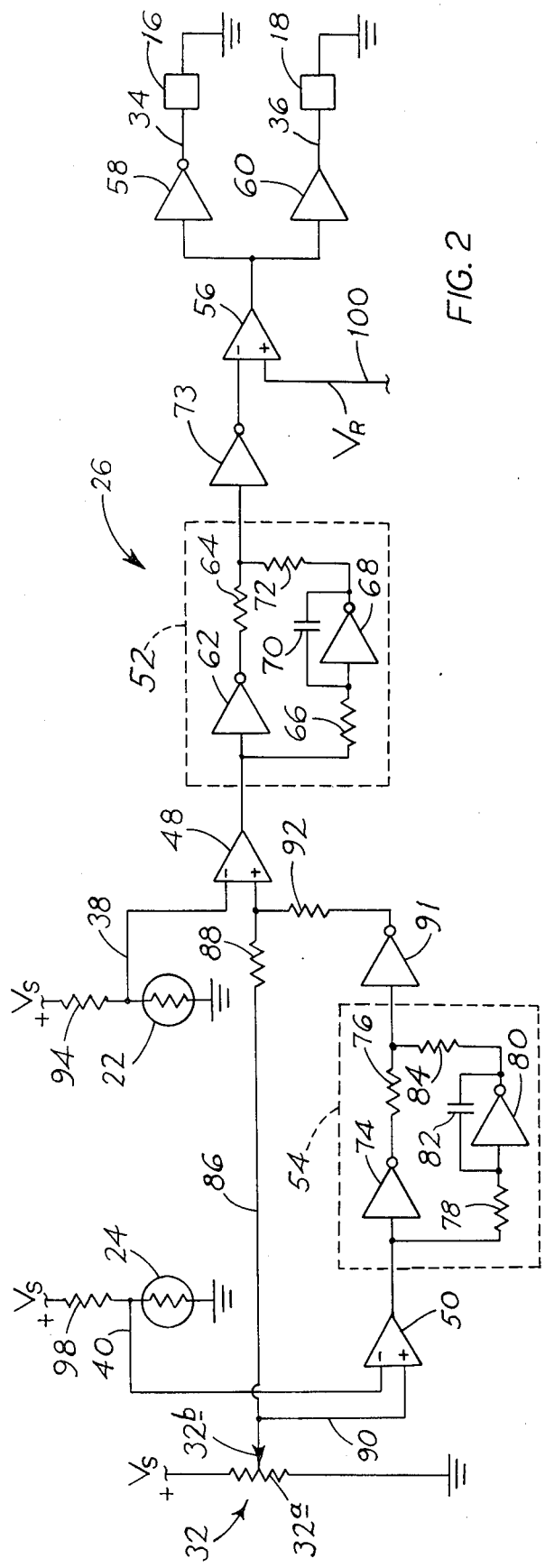
FIG. 2 is a schematic diagram illustrating elements of a control circuit used in the apparatus of FIG. 1.

Turning attention now to FIG. 2, here, certain reference numerals employed in FIG. 1 are repeated to indicate like components. Control circuit 26 includes a pair of input operational amplifiers 48, 50, the outputs of which feed two, combined, inverting-proportional-amplifiers-and-inverting-integrator-circuits enclosed in the dashed blocks designated 52, 54, respectively. The control circuit also includes an output operational amplifier, functioning as a comparator, 56 which feeds the inputs of an inverting amplifier 58 and of a non-inverting amplifier 60.

The "combined" circuit just referred to in dashed block 52 includes upper and lower branches—the upper branch including, in a series, an inverting amplifier 62 and a resistor 64, and the lower branch including, in series, a resistor 66, an inverting amplifier 68 shunted by a capacitor 70, and a resistor 72. The output of block 52 (i.e., the junction between resistors 64, 72) feeds the inverting input in amplifier 56 through an inverting amplifier 73. The "combined" circuit shown within dashed block 54 is substantially identical in construction to the circuit shown in block 52. Here, in an upper branch, are an inverting amplifier 74 and a resistor 76, and in a lower branch, a resistor 78, an inverting amplifier 80 shunted by a capacitor 82, and a resistor 84.

Operation of control circuit 26 depends upon the setting of a reference voltage which determines the final regulation temperature that is achieved by apparatus 10 in water fed to conduit 30. This reference voltage is established through manipulation of previously-mentioned potentiometer 32 which, in FIG. 2, can be seen to include a winding 32a connected between ground and a source of voltage which is labeled Vs. While different specific source voltages (Vs) may be used herein, Vs in the case being described is equal to about +3.0-volts DC. The reference voltage used at any particular time is determined by the setting on winding 32a of the potentiometer's wiper 32b, which is connected via a conductor 86 and a resistor 88 to the non-inverting input in amplifier 48. Wiper 32b is also connected, via a conductor 90, to the non-inverting input in amplifier 50. The junction of previously-mentioned resistors 76, 84 (in circuit block 54) is connected through an inverting amplifier 91 and a resistor 92 to the non-inverting input in amplifier 48.

Considering the connections with circuit 26 established for thermistors 22, 24, thermistor 22 forms part of a voltage divider including a resistor 94—which divider is connected, as shown, between voltage source Vs and ground. The junction between thermistor 22 and resistor 94 is connected via previously-mentioned line 38 to the inverting input in amplifier 48. Similarly, thermistor 24 forms part of a voltage divider with a resistor 98, and the combination of these two elements is connected in series between source Vs and ground. Previously-mentioned line 40 connects the junction between thermistor 24 and resistor 98 to the inverting input in amplifier 50.

Completing a description of what is shown in FIG. 2, and turning attention to output amplifier 56, a conductor 100 supplies a positive-going, saw-tooth ramp voltage Vr to the non-inverting input in the amplifier. This ramp voltage is produced in any suitable manner, and has herein a period of about 1-second, a peak-to-peak amplitude of about 1.0-volt, and is substantially centered, in an amplitude sense, on the source voltage of +3.0-volts. Thus, the ramp voltage "swings" between about +2.5-volts and about +3.5-volts.

The output of inverting amplifier 58 connects through previously-mentioned line 34 to one side of the winding in the solenoid for valve 16, the other side of which winding is grounded. Similarly, the output of non-inverting amplifier 60 connects through line 36 with one side of the winding in the solenoid for valve 18, the other side of which winding also is grounded.

Figure 3:
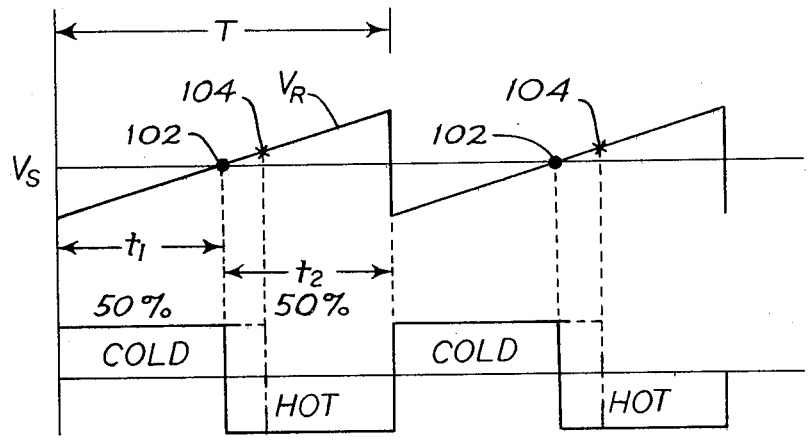
FIGS. 3, 4 and 5 are time-base graphs illustrating three different operating conditions for the apparatus of FIG. 1, and for the circuit elements of FIG. 2.
Figure 4:
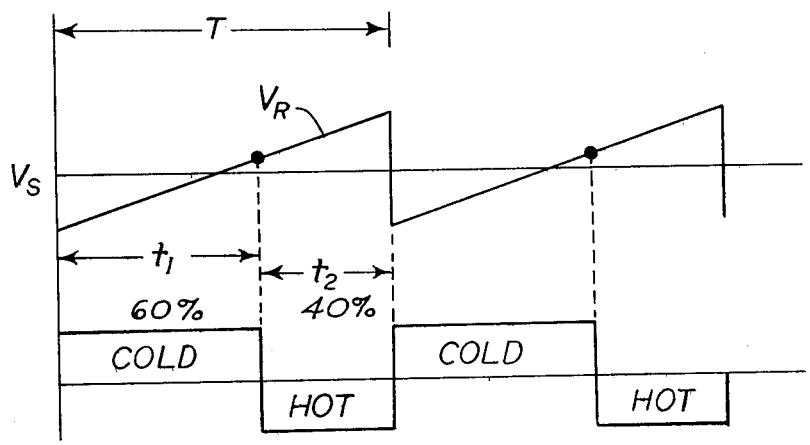
Figure 5:
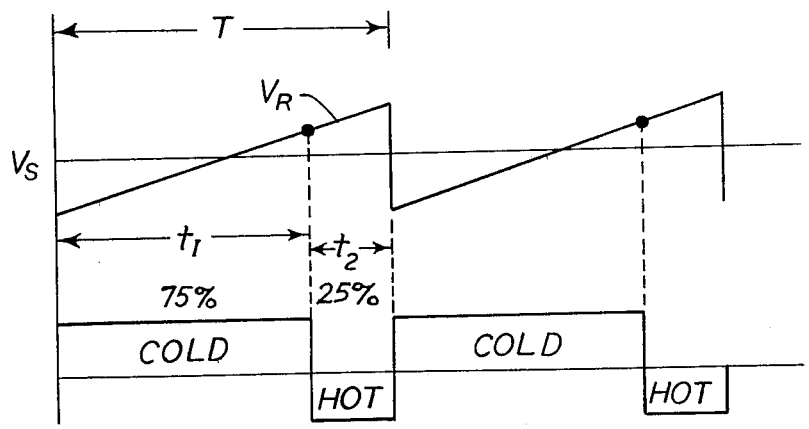

Let us consider now the operations of control circuit 26 and of the other elements in apparatus 10. Referring to FIGS. 3, 4 and 5 along with FIGS. 1 and 2, FIGS. 3, 4 and 5 are similar to one another, except, as mentioned earlier, that they indicate three different specific operating conditions. Each of these figures includes two graphic displays, the top one of which is a time-base display of two cycles of the saw-tooth ramp voltage Vr mentioned earlier, with a point (or points) located along each of the two ramps in the graph to indicate a particular temperature-control operating condition. Below each ramp voltage is a time-base rectangular graph illustrating time periods (duty cycles) during which, according to the operation of apparatus 10, pulses of cold and hot water flow exclusively in the apparatus.

Beginning with FIG. 3, this illustrates, in solid lines, a stabilized operating condition wherein the blend of water which is being delivered to conduit 30 has a temperature substantially exactly half-way between the cold and hot water temperature extremes mentioned above. This temperature, of course, is 110° F., and the operating conditions which exist to assure delivery of water at this temperature will now be described.

Assuming that the input cold and hot water temperatures remain unchanged, and that the supply pressures are equal, it will be apparent to those skilled in the art that, during each one-second operating interval for the apparatus, indicated at T in FIG. 3, 50% of the time must be devoted to the flow of cold water, and 50% devoted to the flow of hot water. These equal portions of interval T are indicated at $t_1$ and $t_2$. This condition is established by selecting a setting in potentiometer 32 which results, with final stabilization of thermistors 22, 24, in an output voltage of substantially exactly +3.0-volts (equal to Vs) on the output of inverting amplifier 73. This voltage, it will be seen, is applied to the inverting input in amplifier 56. Ramp voltage Vr is applied to the non-inverting input in amplifier 56. As a consequence of this situation, and referring to the top graph in FIG. 3, the heavy dot 102 on each ramp indicates when, in time, the positive value of the ramp voltage "crosses" the value of the voltage (+3.0) applied to the inverting input in amplifier 56. Here, it will be seen that the voltage produced by Vr on the non-inverting input in amplifier 56 "crosses" that applied to the inverting input substantially exactly 50% into time interval T. So long as the ramp voltage is "below" the crossing point, a "0"-state voltage exists on the output of amplifier 56, which, in turn, results in a "1"-state voltage existing on the output of amplifier 58, and in a "0"-state voltage existing on the output of amplifier 60. Thus, throughout the first half of the total interval of the ramp voltage, the solenoid in valve 16 is energized, and that in valve 18 is de-energized. What this means, of course, is that cold water alone flows during this first half portion of interval T.

When the ramp voltage value exceeds +3.0-volts at point 102, the output of amplifier 56 switches into a "1" state. This results in de-energizing of the solenoid in valve 16, and in energizing of the solenoid in valve 18, whereupon hot water alone flows in the apparatus. And, it will be seen that this condition exists throughout the remaining half portion of time period T.

Thus, the on-going, instantaneous comparison between the ramp voltage and the voltage applied to the inverting input in amplifier 56 determines when the respective solenoids in valves 16, 18 are energized and de-energized, and specifically, in the case just described, results in each being energized and de-energized substantially exactly one-half of each time interval T. So long as no change occurs which affects the voltage supplied to the inverting input in amplifier 56, this condition remains unchanged, and water delivered to discharge conduit 30 will remain at 110° F.

Three particular conditions can change which will, at least momentarily, affect the stable conditions just described in apparatus 10 and in circuit 26. These three conditions relate to the respective resistances exhibited by thermistors 22, 24, and to the specific setting chosen for potentiometer 32.

Assuming, for a moment, that no adjustment is made in the condition of the potentiometer, and that therefore it is intended that water continue to be delivered to conduit 30 at a temperature of 110° F., let us assume that there is some disturbance or change in the main water supply system which causes the hot water supply temperature to rise in temperature above 160° F. Instantaneously, the system continues with each of valves 16, 18 being open an equal amount of time. However, because the hot water temperature has risen, this will result in a slight increase in the temperature of the ultimate blend, above the desired 110° F. As soon as this blend temperature rise becomes apparent, it will be picked up first by a proportional decrease in the resistance of thermistor 22 which, in turn, will result in a proportional increase in the voltage applied to the inverting input of amplifier 56.

A new higher crossing point, indicated by x 104 in FIG. 3, is now established with respect to the ramp voltage. When this condition exists, it will be apparent that the ramp voltage will cross the new crossing point at a moment in time which is later than midway through time interval T. As a direct result of this, cold water will flow through valve 16 now somewhat longer than will hot water flow through valve 18 during each time interval T. Where the rise in input water temperature is relatively minor, response thereto by a decrease in the resistance of thermistor 22 produces a rather quick response to stabilize the discharged water temperature, without the need for what might be thought of as a back-up response, still to be described, by thermistor 24. Assuming, therefore, that such a change occurs, and holds for a period of time, with hot water now being delivered at a temperature somewhat in excess of 160°

F., the respective duty cycles for flows of cold and hot water during each time interval T will have been adjusted to increase the cold-water duty cycle, and to decrease the hot-water duty cycle, so as to maintain the output discharge temperature at 110° F.

For larger and more dramatic changes, as for example a larger increase in the temperature of input hot water, thermistor 22 will react as before described, but it will be probable that for several cycles of operation, a net increase in blended temperature will also be sensed by thermistor 24. This will result in a decrease in the resistance of thermistor 24, and, ultimately, in the application of a changed signal at the non-inverting input in amplifier 48, which will enhance and augment the activity of thermistor 22 in correcting the duty cycle for cold and hot water flows, to return the merged water temperature to the desired 110° F.

Obviously, reductions in hot water temperature, and/or increases and decreases in input cold water temperature, will produce like corrective responses in the apparatus of the invention.

In FIGS. 4 and 5, two different operating conditions, which happen to relate to conventional photographic processing requirements, are shown. In each, the assumption is still made that hot water is supplied at 160° F., and cold water at 60° F.—there thus still being a 100° F. spread between these temperature extremes. Water supply pressure is also still assumed to be the same for both cold and hot water. FIG. 4 illustrates a stabilized condition in apparatus 10 where output water 30 is delivered to conduit 30 at 100° F.—one of several specific temperatures often called for in film processing. Here, it will be seen that the output water temperature desired is 40% of the difference between the two input water-temperature extremes, and is closer to the cold-water temperature than to the hot-water temperature. Accordingly, and because apparatus 10 operates herein in a linear fashion, throughout time interval T, cold water will flow for 60% (indicated at $t_1$) of a total operating interval, and hot water will flow for 40% (indicated at $t_2$) of the interval. It will be apparent that, with ramp voltage Vr operating between the limits described for it earlier, the steady-state DC voltage which must be applied to the inverting input in amplifier 56 to maintain this condition is +3.1-volts. This, in fact, is the stable condition illustrated graphically in FIG. 4.

FIG. 5 shows a changed condition where it is desired that the output water temperature be 85° F. This temperature, it will be seen, is 25% of the total range of temperature extremes between 60° F. and 160° F., and, again, is closer to the cold-water temperature than to the hot-water temperature. Here also, and since the apparatus being described is linear in nature, cold water flows for a period $t_1$, which is 75% of interval T, and hot water for a period $t_2$, which is 25% of interval T. To maintain this condition, the voltage applied to the inverting input in amplifier 56 is +3.25-volts.

Under all operating conditions, water pulsing from valves 16, 18 flows continuously in coil 20, whose high thermal conductivity, and continuous-flow construction, result in effecting an extremely low-thermal-noise blend which is fed to conduit 30. In the arrangement shown and described herein, a six-foot length of copper tubing, close-coiled to a diameter of about five or six inches, has been found to be extremely satisfactory. Coil 20, unlike a conventional mixing chamber, allows for no "low-flow" dead spots, and thus promotes mixing of the cold and hot water pulses.

Thus, while a preferred embodiment of, and method of practicing, the invention have been disclosed herein, it is appreciated that variations and changes may be made without departing from the spirit of the invention.

It is claimed and desired to secure by Letters Patent:

1. Apparatus for supplying from two liquid input streams which are at different temperatures, an output stream with a regulated temperature which is intermediate the different temperatures, said apparatus comprising:

valve means having inlets compleable to receive liquid from the two input streams, and an outlet adapted to supply the output stream, said valve means being electrically switchable between two different mutually exclusive, operating states, in each of which liquid is permitted to flow to said outlet from a different one-only of said two inlets, a changeable-electrical-characteristic temperature sensor located immediately adjacent said outlet for exhibiting a readable electrical characteristic which is directly relatable to the temperature of liquid flowing from the outlet, circuit means, including temperature-setting means, operatively interposed between said valve means and said sensor for actuating the former in response both to the setting of said temperature-setting means, and to the value of the read characteristic of the latter, the actuation producing pulsed, substantially constant-temperature liquid flow from said outlet as determined by the setting of said temperature-setting means, and being characterized by a fixed operating interval with a variable internal duty cycle, where changes in duty cycle effect temperature control, elongated, high thermal conductivity, heat-exchanging fluid conduit means having a feed end coupled to said outlet, and a discharge end remote from said outlet, said conduit means being adapted to receive an output stream from said outlet, and to accommodate continuous, heat-exchanging flow of the output stream toward the conduit means' said discharge end, and a second changeable-electrical-characteristic temperature sensor, located immediately adjacent said discharge end for exhibiting a readable electrical characteristic which is directly relatable to the temperature of liquid flowing from said discharge end and which is connected operatively to said circuit means, and wherein said circuit means, in addition to responding to the respective conditions of said first-mentioned sensor and said temperature-setting means, also responds to the condition of said other sensor vis-a-vis actuating said valve means.

2. The apparatus of claim 1 wherein said conduit means takes the form of a multi-turn coil.

3. A method for producing from two liquid input streams which are at different temperatures, an output stream with a selected, regulated temperature which is intermediate such different temperatures, said method comprising supplying, during each one of successive, recurrent, fixed-length time intervals, pulses (one each) from the two streams, continuously blending the pulses to create a single stream, feeding the single stream into a continuous-flow-type heat exchanging conduit, at a location downstream from where said blending takes place, monitoring the temperature of the single stream at both ends of the conduit, and as a consequence of said monitoring, and as a response thereto, controlling, during each of the intervals, the respective duty cycles of such pulses, so as to maintain the temperature of such single stream substantially constant at the selected regulated temperature.

* * * * *